United States Patent
Peterson

(10) Patent No.: US 8,099,739 B1
(45) Date of Patent: Jan. 17, 2012

(54) JAVA APPLET MANAGEMENT METHOD

(75) Inventor: Stephen Peterson, Santa Rosa, CA (US)

(73) Assignee: Keithley Instruments, Inc., Cleveland, OH (US)

( * ) Notice: Subject to any disclaimer, the term of this patent is extended or adjusted under 35 U.S.C. 154(b) by 1220 days.

(21) Appl. No.: 11/763,041

(22) Filed: Jun. 14, 2007

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/320; 709/224; 709/227

(58) Field of Classification Search .................. 709/224, 709/227; 719/316, 328, 32
See application file for complete search history.

(56) References Cited

U.S. PATENT DOCUMENTS

| | | | | |
|---|---|---|---|---|
| 6,560,557 B1 * | 5/2003 | Carnahan et al. | ............. | 702/122 |
| 7,694,297 B2 * | 4/2010 | Ullman et al. | ................ | 717/178 |
| 7,765,556 B2 * | 7/2010 | Hauser et al. | ................ | 719/318 |
| 2002/0138618 A1 * | 9/2002 | Szabo | ............................ | 709/225 |
| 2002/0161894 A1 * | 10/2002 | Tapperson | .................... | 709/227 |
| 2002/0188428 A1 * | 12/2002 | Faust | ............................ | 702/188 |
| 2003/0140089 A1 * | 7/2003 | Hines et al. | ................... | 709/202 |
| 2004/0255307 A1 * | 12/2004 | Irudayaraj | ..................... | 719/328 |
| 2005/0027852 A1 * | 2/2005 | Tilander et al. | ............... | 709/224 |
| 2006/0248547 A1 * | 11/2006 | Bockhold et al. | ............. | 719/330 |
| 2008/0313339 A1 * | 12/2008 | Faucher et al. | ............... | 709/227 |

* cited by examiner

*Primary Examiner* — Diem Cao
(74) *Attorney, Agent, or Firm* — Pearne & Gordon LLP

(57) ABSTRACT

A method for managing Java applets in HTML pages, the HTML pages being rendered by a web browser, includes: browsing a page having an applet, the applet being loaded into the page and creating a connection to a server; leaving the page, the applet providing an idle message to the server and being stored in a cache of applet objects, each object having a connection ID; and returning to the page, the applet being retrieved from the cache based on the connection ID, the applet reloading and providing an activate message to the server to reuse the connection.

2 Claims, 1 Drawing Sheet

JAVA APPLET MANAGEMENT METHOD

BACKGROUND OF THE INVENTION

The present invention relates to web page communication with a server and, in particular, to reloading Java applets.

Web browsers are used to render HTML web pages. Java applets are programs written in the Java language that are loaded by the web page and executed. When a user browses a combination HTML/applet page, the Java runtime environment (JRE) is loaded, providing an environment for the applet to function in. When the user leaves the page, the applet is unloaded, but the JRE remains. The JRE maintains static/global variables.

A problem with common implementations of this operation is that in cases where the applet has opened a communications connection with a server, reloading the applet requires completely recreating this connection. While the applet code itself may be cached, saving some time in reloading, recreating the connection accounts for most of the time (e.g., 3 times as long in local connections and over 200 times as long (e.g., 5 seconds) in an Internet VPN connection). This delay can be very apparent and undesirable when, for example, a user is using a web page to monitor a server, such as a web-enabled test instrument. A typical user expectation would be for data from the server, such as measured electrical parameters, to appear with little apparent delay when the web page is reloaded.

SUMMARY OF THE INVENTION

A method for managing Java applets in HTML pages, the HTML pages being rendered by a web browser, includes: browsing a page having an applet, the applet being loaded into the page and creating a connection to a server; leaving the page, the applet providing an idle message to the server and being stored in a cache of applet objects, each object having a connection ID; and returning to the page, the applet being retrieved from the cache based on the connection ID, the applet reloading and providing an activate message to the server to reuse the connection.

DESCRIPTION OF THE PREFERRED EMBODIMENTS

Figure 1:
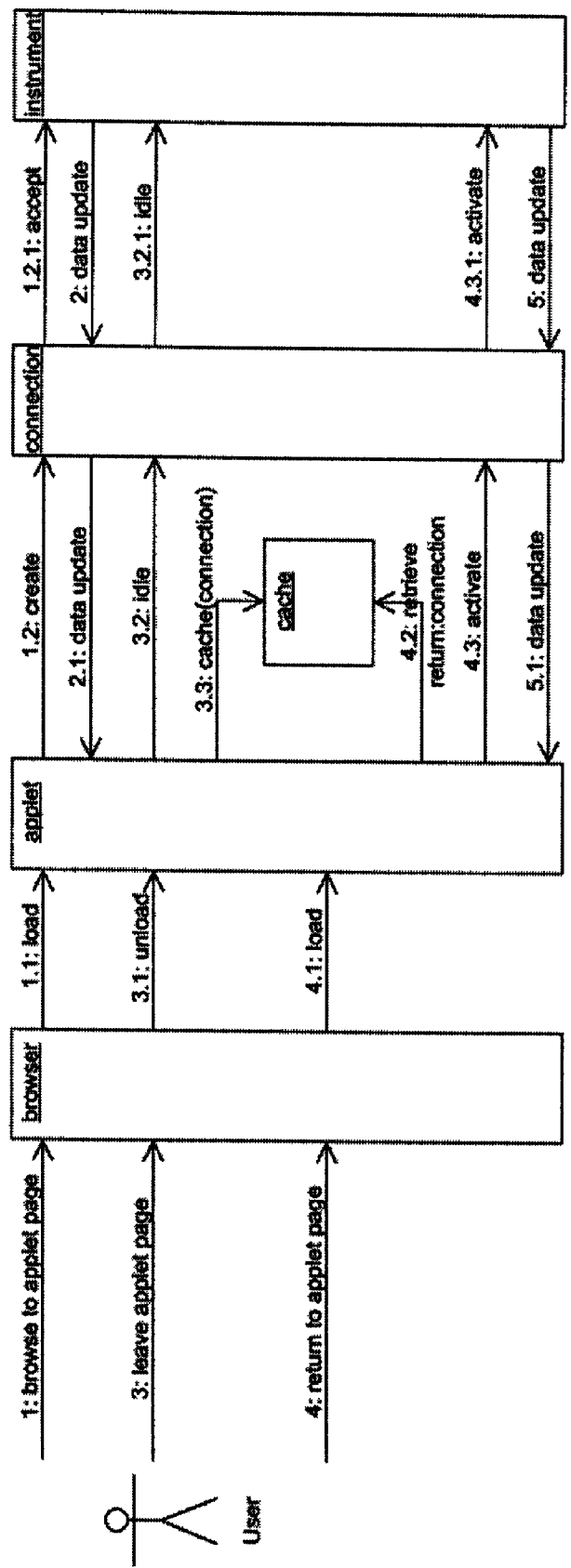
FIG. 1 is a collaboration diagram for an example of a method according to the invention.

Referring to FIG. 1, a dynamic model of an example of the invention is depicted as a collaboration diagram.

Such a method for managing Java applets may be implemented, for example, by creating a single container object for the applets (e.g., ComponentCache). The ComponentCache instance is saved in a static list rather than a static singleton instance. When and if a browser uses a shared JRE instance, cache objects are added/removed from the list rather than overwriting the singleton instance.

If the browser does not use a shared JRE instance, the list will never hold more than 1 item (e.g., this scheme works regardless of shared vs. non-shared JRE instances).

To minimize the delays associated with creating connections between an applet and a server (e.g., a test instrument); the classes that implement the socket communication use an administrative message to inform the server that the connection has been idled. The applet (running in the browser) is considered the controller of the connection and sends the idle message when the applet is unloaded by the browser. The server will not send or request information from the applet until it receives an administrative message to activate the connection.

When a connection is idled, the server is still monitoring the connection waiting for input from the applet. However, the server will not attempt to send any information to the applet. The monitoring is used to detect the activate message.

Most modern browsers use shared JRE instances. When a user has multiple browser windows open to multiple servers, the cache can contain applets/connections objects with different connection parameters (e.g., the IP address is different) . To avoid needlessly resetting connections due to mismatched connection parameters, applets/connections objects can be advantageously retrieved from the cache based on these parameters. For example, each object can have a connection ID. For instance, if an applet wants to establish a connection to 192.168.1.100 the cache retrieval will first attempt to retrieve an applet/connection already assigned to 192.168.1.100 (as opposed to a typical caching scheme of retrieving the first available object), ignoring connections with other addresses.

This method is a combination of caching techniques and communication channel management designed to work in shared JRE instantiations with both the standard (e.g., Sun/Java) applet life cycle and with non-standard implementations (e.g., Microsoft) of the applet life cycle.

The non-standard implementation of the applet life cycle results in the applet being destroyed even when the standard life cycle calls for the applet to remain in memory. This defeats the normal caching strategy of keeping variables in the applet instance. The variable life cycle of the applet (standard and non-standard) can be handled by caching objects in static global variables and saving/retrieving them from Applet::start( ) and Applet::stop( ).

Performance gains come from caching the communication connection because the time to setup a socket connection is usually much greater than creating/initializing software objects. In this implementation, either end of the communication connection can send unsolicited data or commands to the other end (e.g., measurement data from the instrument to the applet or commands corresponding to user key/mouse activity from the applet to the instrument). Because of this, when the connection is cached (at the applet end) the server (the instrument) must not send or request any information else the connection will eventually block the server when the communication buffers are full.

When an applet determines that it cannot reuse a connection, it simply closes the existing socket connection and establishes a new one. Because the server is monitoring the connection (expecting an activate message), when the connection is closed it causes an error which in turn closes and releases the resources associated with the connection.

When the applet does reuse a connection and optionally tested the connection to insure the connection is valid, both ends of the communication connection will send recent information to bring everything up to date. For example, generally the instrument has made measurements of electrical parameters since the applet was last connected, so the instrument will publish the most recent measurement data to insure the applet is displaying it. After the refresh operations are complete, the restore from cache of the communication connection (and any local objects in the applet) is complete and normal operation is resumed.

To allow the method to recover from extreme conditions (e.g., the user opening a large number of browsers) the cache list can be restricted to storing a fixed number of objects (e.g. there is no caching after N applet instances are used).

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method for managing Java applets in HTML pages, said HTML pages being rendered by a web browser, said method comprising:

browsing a page having an applet, said applet being loaded into said page and creating a connection to a server;

leaving said page, said applet providing an idle message to said server and being stored in a cache of applet objects, each object having a connection ID;

returning to said page, said applet being retrieved from said cache based on said connection ID, said applet reloading and providing an activate message to said server to reuse said connection;

wherein said server is a test instrument for measuring electrical parameters; and said test instrument transmits measurement data since the last idle message to said applet when said activate message is received by said instrument and does not transmit measurement updates to said applet when said idle message is received by said instrument.

2. A method according to claim 1, wherein said connection ID corresponds to an IP address.

* * * * *